(12) United States Patent
Gangadharaiah et al.

(10) Patent No.: US 11,797,769 B1
(45) Date of Patent: Oct. 24, 2023

(54) ARTIFICIAL INTELLIGENCE SYSTEM USING HYBRID TECHNIQUE FOR TASK-ORIENTED DIALOG MANAGEMENT

(71) Applicant: Amazon Technologies, Inc., Seattle, WA (US)

(72) Inventors: Rashmi Gangadharaiah, San Jose, CA (US); Charles Elkan, Seattle, WA (US); Balakrishnan Narayanaswamy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1,715 days.

(21) Appl. No.: 15/841,122

(22) Filed: Dec. 13, 2017

(51) Int. Cl.
| | |
|---|---|
| *G06F 40/35* | (2020.01) |
| *G06F 40/284* | (2020.01) |
| *G06N 20/00* | (2019.01) |
| *G06N 3/08* | (2023.01) |
| *G10L 15/18* | (2013.01) |
| *H04L 51/02* | (2022.01) |
| *G06N 3/045* | (2023.01) |
| *G10L 15/22* | (2006.01) |

(52) U.S. Cl.
CPC .......... *G06F 40/284* (2020.01); *G06N 3/045* (2023.01); *G06N 3/08* (2013.01); *G06N 20/00* (2019.01); *G10L 15/1822* (2013.01); *H04L 51/02* (2013.01); *G06F 40/35* (2020.01); *G10L 15/22* (2013.01)

(58) Field of Classification Search
CPC ....... G06F 40/35; G06F 16/3329; G06F 40/44; G06N 20/00; G06N 3/0454; G06N 3/08; H04L 51/02; G06F 40/284; G10L 15/1822; G06N 3/045; G10L 15/22
See application file for complete search history.

(56) References Cited

U.S. PATENT DOCUMENTS

| | | |
|---|---|---|
| 6,246,981 B1 | 6/2001 | Papineni et al. |
| 6,510,411 B1 | 1/2003 | Norton et al. |

(Continued)

OTHER PUBLICATIONS

"Getting Started with the Alexa Skills Kit", Amazon Apps & Games Developer Portal, Retrieved from URL: https://developer.amazon.com/pulbic/solutions/slexas/alexa-skills-kit/getting-started-guide on Oct. 30, 2016, Pages 1-7.

"Microsoft Cognitive Services - APIs", Retrieved from URL: https://www.microsoft.com/cognitive-services/en-us/apis on Oct. 30, 2016, Pages 1-8.

(Continued)

*Primary Examiner* — Wilson W Tsui
(74) *Attorney, Agent, or Firm* — Robert C. Kowert; Kowert, Hood, Munyon, Rankin & Goetzel, P.C.

(57) ABSTRACT

In response to determining that a particular sequence of natural language input has been generated by a first entity participating in a multi-interaction dialog, a first representation of accumulated dialog state associated with the sequence is obtained from a machine learning model at an artificial intelligence service. Based on the first representation, a state response entry is selected from a collection of state response entries. The state response entry indicates a mapping between a second representation of accumulated dialog state, and a response recorded in a training example of the model. The recorded response is implemented.

21 Claims, 11 Drawing Sheets

(56) References Cited

U.S. PATENT DOCUMENTS

| | | | |
|---|---|---|---|
| 7,197,460 | B1 | 3/2007 | Gupta et al. |
| 2017/0337478 | A1* | 11/2017 | Sarikaya et al. ........ G06F 3/167 |
| 2017/0372200 | A1* | 12/2017 | Chen et al. .......... G06N 3/0445 |
| 2018/0075343 | A1* | 3/2018 | van den Oord et al. ................ G06N 3/0454 |
| 2018/0203852 | A1* | 7/2018 | Goyal et al. .......... G06N 3/006 |

OTHER PUBLICATIONS

"Training for the Alexa Skills Kit", Amazon Apps & Games Developer Portal, Retrieved from URL: https://developer.amazon.com/public/solutions/alexa/alexa-skills-kits/content/alexa-skilss-developer-training on Oct. 30, 2016, Pages 1-4.

Alessandro Sordoni, et al., "A Neural Network Approach to Context-Sensitive Generation of Conversation Responses", arXiv:1506.06714v1 [cs.CL], Jun. 22, 2015, Pages 1-11.

Ali El-Kahky, et al., "Entending Domain Coverage of Language Understanding Systems Via Intent Transfer Between Domains Using Knowledge Graphs and Search Query Click Logs", 2014 IEEE International Conference on Acoustic, Speech and Signal Processing (ICASSP), Pages 4087-4091.

Amit Fulay, "Say hello to Google Allo: a smarter messaging app", Retrieved from URL: https://blog.google/products/allo/google-allo-smater-messaging-app on Oct. 30, 2016, Pages 1-14.

Antoine Bordes, et al., "Learning End-to-End Goal-Oriented Dialong", arXiv:1605.07683v4 [cs.CL], Mar. 30, 2017, Pages 1-15.

Arul Menezes, et al., "Using Dependency Order Templates to Improve Generality in Translation", Proceedings of the Second Workshop on Statistical Machine Translation, Jun. 2007, Pages 1-8.

Bhuwan Dhingra, et al., "Towards End-to-End Reinforcement Learning of Dialogue Agents for Information Access", arXiv-1609.00777v3 [cs.CL], Apr. 20, 2017, Pages 1-12.

Chia-Wei Liu, et al., "How Not to Evaluate Your Dialogue System: An Empirical Study of Unsupervised Evaluation Metrics for Dialogue Response Generation", arXiv:1603.08023v2 [cs.CL], Jan. 3, 2017, Pages 1-15.

Christian S. Perone, "Machine Learning :: Cosine Similarity for Vector Space Models (Part III)," published: Terra Incognita, Dec. 9, 2013, pages 1-4 (Year: 2013).*

Collen Estrada, "Microsoft Bot Framework", Mar. 30, 2016, Retrieved from URL: https://blog.botframework.com/2016103130/BotFramework/ on Oct. 30, 2016, Pages 1-7.

Dan Bohus, et al., "RavenClaw: Dialog Management Using Hierarchical Task Decomposition and an Expectation Agenda", Carnegie Mellon University Research Showcase @CMU, 2003, Pages 1-5.

Elad Natanson, "Messaging Platforms, Bots and The Future of Mobile", Retrieved from URL: http://www.forbes.com/sites/eladnatanson/2016/04/08/messaging-platforms-bot-and-the-future-of-mobile/#2d1ab79884af on Oct. 30, 2016. Pages 1-7.

Heriberto Cuayahuitl, "SimpleDS: A Simple Deep Reinforcement Learning Dialogue System", arXiv:1601.04574v1 [cs. A], Jan. 18, 2016, pages 1-6.

Himanshu S. Bhatt, et al., "Cross-domain Text Classification with Multiple Domains and Disparate Label Sets", Proceedings of the 54th Annual Meeting of the Association for Computational Linguistics, Aug. 7, 2016-Aug. 12, 2016, Pages 1641-1650.

Jason D. Williams, et al., "End-to-end LSTM-base dialog control optimized with supervised and reinforcement earning", arXiv:1606.01269v1 [cs.CL], Jun. 3, 2016, Pages 1-10.

Jason Williams, et al., "The Dialog State Tracking Challenge", Proceedings of the Sigdial 2013 Conference, Aug. 22, 2013–Aug. 24, 2013, pages 404-413.

Jeffrey Pennington, et al., "GloVe: Global Vectors for Word Representation", Proceedings of the 2014 Conference on Empirical Methods in Natural Language Processing (EMNLP), Oct. 25, 2019-Oct. 29, 2019, Pages 1532-1543.

Jesse Dodge, et al., "Evaluating Prerequisite Qualities for Learning End-to-End Dialog Systems", arXiv:1511.06931v6 cs.CL], Apr. 19, 2016, Pages 1-16.

Jiwei Li, et al., "A Diversity-Promoting Objective Function for Neural Conversation Models", arXiv:1510.03055v3 [cs. CL], Jun. 10, 2016, Pages 1-11.

Jiwei Li, et al., "Deep Reinforcement Learning for Dialogue Generation", arXiv:1606.01541v4 [cs.CL], Sep. 29, 2016, Pages 1-11.

Justine Cassell, "Embodied Conversational Agents Representation and Intelligence in User Interfaces", Ai Magazine, volume 22, No. 4, 2001, Pages 67-84.

Kaisheng Yao, et al., "Spoken Language Understanding Using Long Short-Term Memory Neural Networks", IEEE, 2014, Pages 189-194.

Kishore Papineni, et al, "Bleu: a Method for Automatic Evaluation of Machine Translation", Proceedings of the 40th Annual Meeting of the Association for Computational Linguistics (ACL), Jul. 2002, Pages 311-318.

Kyunghyun Cho, et al., "Learning Phrase Representations using RNN Encoder-Decoder for Statistical Machine Translation, arXiv:1406.1078v3, Sep. 3, 2014, Pages 1-15.

Lifeng Shang, et al., "Neural Responding Machine for Short-Text Conversation", arXiv:1503.02364v2, Apr. 27, 2015, Pages 1-12.

Julian Vlad Serban, et al., "A Survey of Available Corpora for Building Data-Driven Dialogue Systems", arXiv-1512.05742v3 [cs.CL], Mar. 21, 2017, Pages 1-56.

Matteo Pagliardini, et al., "Unsupervised Learning of Sentence Embeddings using Compositional n-Gram Features", arXiv:1703.02507v2, Jul. 10, 2017, Pages 1-11.

Matthew Henderson, et al., "Robust Dialog State Tracking Using Delexicalised Recurrent Neural Networks and Unsupervised Adaptation", Spoken Language Technology Workshop (SLT), 2014, pages 1-6.

Robert Jamison, "Announcing a New Tool for Building Interactive Adventure Games on Alexa", Amazon Mobile App Distribution Blog, Retrieved from URL: https://developer.amazon.com/public/community/post/TxEQV5K754YS77/Announcing-a-New-Tool-for-Building-Interactive-Adventure-Games-on-Alexa on Oct. 30, 2016, Pages 1-11.

Seth Rosenberg, "How to Build Bots for Messenger", Facebook for Developers, Retrieved from URL: https://developers.facebook.com/blog/post/2016/04/12/bots-for-messenger on Oct. 30, 2016, Pages 1-5.

U.S. Appl. No. 15/360,814, Filed Nov. 23, 2016, Vikram Sathyanarayana Anbazhagan et al.

U.S. Appl. No. 15/360,818, Filed Nov. 23, 2016, Vikram Sathyanarayana Anbazhagan et al.

U.S. Appl. No. 15/625,942, Filed Jun. 16, 2017, Vikram Sathyanarayana Anbazhagan et al.

U.S. Appl. No. 15/716,987, Filed Sep. 27, 2017, Rashmi Gangadhariah et al.

Wikipedia, "Vorbis", Retrieved from URL: https://en.wikipedia.org/wiki/Vorbis on Sep. 26, 2016, Pages 1-10.

Yu et al, "Lstm Encoder-Decoder For Dialogue Response Generation", publisher: IEEE, published: 2016, pages 538-543 (Year: 2016).*

Ilya Sutskever, et al., "Sequence to Sequence Learning with Neural Networks", Advances in Neural Information Processing Systems, 2014, Pages 1-9.

M. Gasic, et al., "On-Line Policy Optimisation Of Bayesian Spoken Dialogue Systems Via Human Interaction", In 2013 IEEE International Conference on Acoustics, Speech and Signal Processing, Pages 1-5.

"Messenger Platform", Facebook for Developers, Retrieved from URL: https://developers.facebook.com/doc/messenger-platform on Oct. 30, 2016, Pages 1-3.

* cited by examiner

| Interaction (turn) number 202 | Dialog participant (customer) utterance 204 | TDMS automated agent response 206 |
|---|---|---|
| Interaction #1 | "I got charged for <X> membership; after the trial period I didn't want to continue" 204A | "Hello <U1>, my name is <A1>, I can help you resolve this problem" 206A |
| Interaction #2 | <Silence> 204B | "Thank you for trying the membership. I'm sorry you were charged beyond the trial – I will clear it up for you" 206B |
| Interaction #3 | "Thanks! I didn't expect to be charged after the trial expired" 204C | "You're very welcome" 206C |
| Interaction #4 | <Silence> 204D | "I will now cancel your membership" + API_Call(cancel_and_refund) 206D |
| Interaction #5 | "Thanks! I appreciate your help" 204E | "You should get your refund credited shortly. Anything else I can help you with?" 206E |
| Interaction #6 | "Great! That's all I needed. Bye" 204F | "Goodbye" 206F |

FIG. 2

ARTIFICIAL INTELLIGENCE SYSTEM USING HYBRID TECHNIQUE FOR TASK-ORIENTED DIALOG MANAGEMENT

BACKGROUND

Dialog-driven applications, in which commands or requests directed to the application are often expressed in conversational or natural language, are becoming increasingly common. An interaction session which eventually results in an external task (such as acquisition of a restaurant reservation) being performed on behalf of a user, or in some information being provided to a user, may often involve multiple individual interactions or "turns," and an automated agent of the dialog-driven application may have to select the appropriate language and/or actions to respond to the user at each stage of the session. Some types of dialog-driven applications may be referred to as "chatbots", as the experience provided to the users of such applications is intended to be similar to that which may be provided by a human agent chatting or informally conversing with the user.

Some dialog-driven applications may be fairly restricted in their domains – e.g., they may help users to perform very specific tasks which require only a few decisions to be made, such as ordering food from a particular type of restaurant. Depending on how limited the domain of an application is, in some cases it may be possible to achieve fairly good performance with a scripted approach, where both the user and the application's automated agent are limited to a fairly small set of responses and actions.

However, with recent advances in speech recognition and natural language understanding, large or "open-domain" dialog-driven applications are becoming more feasible. In such applications, the fluency (e.g., as evidenced by grammatical correctness and the use of conversation-partner-appropriate rather than stilted or formulaic language) as well as the coherence (e.g., as evidenced by the logical correctness of the responses and actions taken at different stages of an interaction) of automated responses may both be very important for the success of the application. Unfortunately, attaining desired levels of fluency and coherence for large dialog-driven applications remains a non-trivial technical challenge.

BRIEF DESCRIPTION OF DRAWINGS

FIG. 2 illustrates an example sequence of interactions of a task-oriented dialog between an entity and an artificial agent implemented at a task-oriented dialog management service, according to at least some embodiments.

Figure 1:
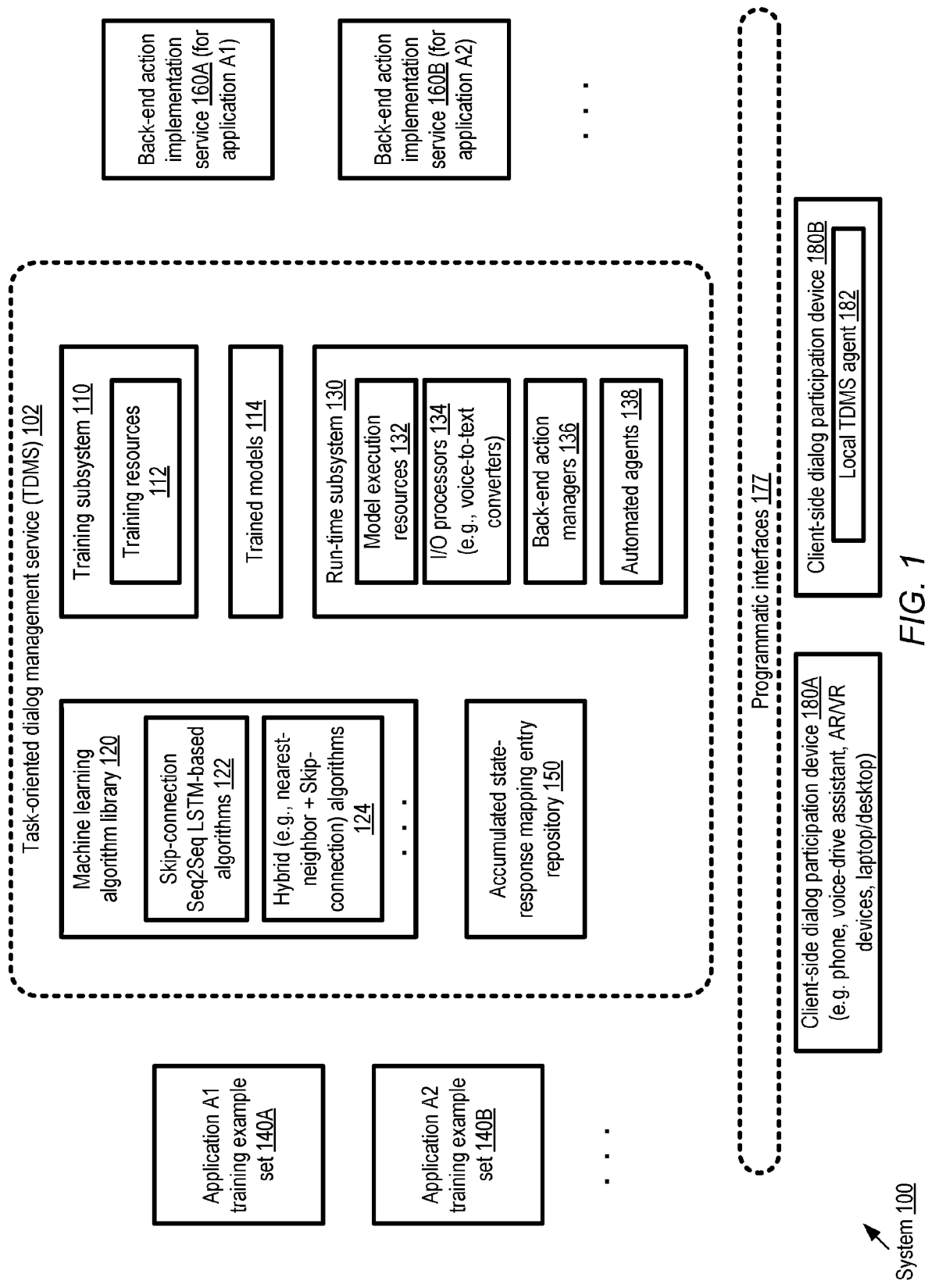
FIG. 1 illustrates an example system environment in which a task-oriented dialog management service utilizing machine learning methodologies may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for identifying and implementing responses provided by automated agents during various interactions of a task-oriented dialog-based application are described. In various embodiments, the execution of a task-oriented dialog-based application may comprise a session which includes several interactions between an application end-user (who may also be referred to as a client or a customer of the application) and an automated or artificial agent, usually resulting in one or more tasks being performed on behalf of the end-user. In at least some of the interactions, respective sequences of natural language tokens (e.g., words) may be uttered (or presented in non-audio form) by either or both of the participants (the customer and the automated agent). In at least some embodiments, in order to fulfill a requested task, a set of operations may have to be initiated using some service or resources external to the dialog-based application itself - e.g., one or more application programming interfaces (APIs) of a network-accessible service may have to be invoked, a database may have to be accessed and/or updated, and so on. Such operation initiations may be considered part of the response provided by the automated agent in an interaction of the session in various embodiments.

Thus, at least in some embodiments, a response to some set of natural language tokens generated by the customer may include (a) the generation of a corresponding set of natural language tokens and/or (b) an initiation and/or completion of an action which may require resources external to the dialog-driven application itself.

In various embodiments the dialog-based application may be considered successful if the language generated by the automated agent in response to the language of the customers during the interactions is at least reasonably fluent, and if the tasks that the customers intended to request are performed to the satisfaction of the customers. The natural language sentences or phrases generated by the automated agent may be considered fluent in such embodiments if, for example, they are easily understandable by someone with the level of language skills typical of the application's customers, and do not contain at least some obvious examples of grammatical errors. Fluency is of course a somewhat subjective term; during training of machine learning models which may be employed in various embodiments, machine translation-related metrics such as BLEU (bi-lingual evaluation understudy) scores comparing the generated output of the automated agents to human agent-generated language in the corresponding training examples may be used as a proxy of fluency. In order to fulfill the intended tasks of the application customers, the responses of the automated agents may also have to be coherent in various embodiments -that is, the responses may have to be logical or sensible considering the dialog context. Note that a coherent response may not guarantee fluency; and conversely, a fluent response may not necessarily be coherent. During training of at least some of the machine learning models which may be employed in some embodiments, in scenarios in which an external API query or request is generated by an automated agent as part of a response, a metric of the similarity between the API call signatures (API calls and their parameters) generated by the automated agent, and the API call signatures indicated in the training examples, may be used as a coherency measure.

Several different types of machine learning methodologies and models may be used to analyze the language uttered or presented by a dialog-driven application customer in various embodiments, and to generate corresponding responses to the customer. For example, recurrent neural network based models, such as variants of sequence-to-sequence (Seq2Seq) models (called skip-connection models) that include an encoder unit with one set of artificial neurons and a decoder unit with another set of artificial neurons, may be used to map input sequences of words (uttered for example by an application customer) to output sequences of words (uttered by an automated agent in response) in some embodiments. However, the results (e.g., with respect to fluency, coherence, or both fluency and coherence) obtained using such a model may sometimes be improved upon by utilizing a hybrid approach. In one such hybrid approach that may be employed in some embodiments, a database of state-response mapping entries may be stored, with a given entry mapping a representation of accumulated dialog state (obtained from a skip-connection model trained for the application) to a response that was actually provided in that state by a trusted agent (as indicated in a training example used for the skip-connection model). Internal or hidden components of the skip-connection models or other similar models may be used to generate the representations of accumulated dialog state at run time in such embodiments, and then those representations may in turn be used to select state-response entries representing very similar dialog states that were encountered during training. The responses indicated in the mappings may then be implemented. Because the training examples represent "ground truth" observations, in which for example the language was generated by trusted human agents (or in some cases, trusted automated agents) and the actions that were initiated were initiated by humans or trusted agents, the responses identified in the training examples may at least in some cases be more fluent and coherent than the responses that may be produced as output using the skip-connection models alone. The overall suitability of the actions with respect to the current state of the dialog may of course, depend on how similar the current state is to the state for which the selected state-response entry was created. In at least some embodiments, the results produced by the skip-connection models themselves may also be considered among the candidates from which a final response is selected, as discussed below in further detail. In some embodiments, other types of machine learning models (e.g., models that are not variants of sequence-to-sequence models, or variants other than the skip-connection models) may be used.

According to at least some embodiments, a system may comprise one or more computing devices of an artificial intelligence service used for task-oriented dialog management. Using a training data set comprising a plurality of examples of dialog interactions (involving human agents or other trusted agents), a machine learning model may be trained at the artificial intelligence service to generate respective recommended responses to sequences of input natural language tokens generated by an entity (e.g., an application user) in a multi-interaction task-oriented dialog. A given interaction of the multi-interaction task-oriented dialog may comprise detecting a sequence of input natural language tokens generated by the entity and implementing a corresponding response, wherein the response in turn comprises causing a sequence of output natural language tokens to be presented.

In various embodiments, a plurality of state-response entries may be stored in a repository of the artificial intelligence service. A particular state-response entry may indicate a mapping between (a) a representation of accumulated dialog state associated with one or more interactions, obtained from a trained version of the machine learning model and (b) a corresponding response indicated in an example of the training data set. The state may be described as "accumulated" in that, because of the way that information flows within the model and is extracted from the model (as described below in further detail), information about earlier stages/interactions of the dialog may automatically be incorporated in the extracted state representation in various embodiments. The representation of the accumulated state information may be of a fixed size in at least some embodiments (e.g., a 512-element numeric vector may be used, or a 256-element numeric vector may be used), independent of the number of words/actions in any given interaction.

After the model has been trained and the repository has been populated with at least some of the state-response entries, in various embodiments the model may be deployed for production or post-training use for managing task-oriented dialogs. In response to determining, as part of a current dialog being processed, that a particular sequence of input natural language tokens has been generated by a first entity (such as an application user), a representation of accumulated dialog state of the current dialog may be obtained from a trained version of the model in some embodiments. Based at least in part on computing respective distance metrics between the representation of the current state, and one or more other representations of accumulated dialog states corresponding to respective state-response entries stored in the repository, a particular state-response entry meeting a distance criterion (e.g., based on computing the Euclidean distance, Manhattan distance, or cosine distance between the current state representation and state representations in entries that were generated earlier) may be identified in various embodiments. In some embodiments, for example, a nearest-neighbor algorithm may be used to identify the particular state-response entry. In various embodiments, at least a portion of a response indicated in the particular state-response entry may be implemented on behalf of the entity participating in the dialog. For example, if the response that was recorded in the training example comprises some number of natural language tokens or words, at least a subset of those tokens or words may be presented in an audio and/or text format. In at least one embodiment, the response may comprise displaying an excerpt of a video or audio.

In at least some embodiments, the machine learning model trained to generate recommended responses, but then later used at least in part for determining dialog state representations such as those used for populating the repository with state-response entries, may comprise a neural network model. The accumulated dialog state representation may, in some such embodiments, comprise a vector generated within the neural network, e.g., at one or more hidden layers of the network. In at least some embodiments, the model may comprise one or more long short-term memory units (LSTMs).

In one embodiment, the model may comprise an encoder unit and a decoder unit. The state representation may be obtained from a layer of the decoder, a layer of the encoder, or a combination of the decoder and the encoder in such embodiments. During training of the model, in some embodiments, respective copies or instances of the encoder and decoder units may be used for each stage of the interaction session. Thus, in such embodiments, a respective per-interaction instance of a pair of neural network based units may be employed, where the pair of units comprises an encoder unit and a decoder unit. At least a subset of parameters of the encoders of the per-interaction instances may be shared among the instances in such embodiments, and at least a subset of respective parameters of the decoders of the per-interaction instances may be shared among the instances. Also during training, the input to an encoder module corresponding to a particular interaction (e.g., the K$^{th}$ interaction between an application customer and the automated agent) of a session may include a vector generated at an encoder module corresponding to a previous interaction (e.g., the (K-1)$^{th}$ interaction) of the session, as discussed in further detail below. After the training is completed, only a single instance of an encoder and a single instance of the decoder may be used in at least some embodiments.

As mentioned earlier, in various embodiments the response provided by the automated agent of the task-oriented dialog management service may comprise some combination of uttered or presented natural language tokens and/or invocation of an external action. In some embodiments, the action may be implemented (at the request of the automated agent or the task-oriented dialog management service) at some other network-accessible service, and may be initiated as a result of an API call. In at least one embodiment, a response may comprise presentation to the dialog participant of a result obtained from such a service (such as data fetched from a reservation database). In some embodiments, in addition to or instead of comprising natural language tokens in text format, the response may comprise a presentation of natural language tokens in audio format, and/or presentation of a video. In various embodiments, any of a number of small-footprint client devices, such as phones, voice-driven assistants, augmented reality or virtual reality devices and the like may be used to respond to the application customer's dialog segments.

The techniques described may result in a number of technical improvements or advances relative to alternative approaches. For example, because of the higher quality of the responses, the total number of times that application customers have to interact with automated agents may be reduced in various embodiments, resulting in a reduction in resource usage (e.g., with respect to CPU usage, network usage and the like) for the dialog-drive applications. Furthermore, relatively compact fixed size representations of accumulated dialog state and of corresponding responses may be used in various embodiments, enabling a substantial reduction in memory use compared to some approaches in which state information for numerous interactions may be concatenated to represent the accumulated state of a dialog. The compact size of the information used to select responses, and the relatively small size of the trained skip-connection model in various embodiments, may enable a substantial portion of the work required for dialog-driven applications to be implemented at small footprint devices such as phones or voice-driven assistants, further reducing network usage and usage of other resources.

Example System Environment

FIG. 1 illustrates an example system environment in which a task-oriented dialog management service utilizing machine learning methodologies may be implemented, according to at least some embodiments. As shown, system 100 may include various resources and artifacts of a task-oriented dialog management service (TDMS) 102 that may be employed for a variety of problem domains and associated applications. The TDMS may include a training subsystem 110 comprising some set of training resources 112. At the training resources, a variety of application-specific training data sets, such as training examples 140A pertaining to application A1 and training examples 140B pertaining to some other application A2 may be used to train one or more machine learning models 114. A variety of machine learning algorithms of a library 120 accessible from the TDMS 102 may be employed in various embodiments for the models, including for example skip-connection LSTM-based sequence-to-sequence (Seq2Seq) algorithms 122 which generate output sequences of natural language tokens in response to input sequences of natural language tokens, hybrid algorithms 124 which may combine aspects of the sequence-to-sequence algorithms and distance-based algorithms for response identification, and so on.

After one or more models to be used to generate responses have been trained, they may be utilized to manage dialogs between various entities, such as dialogs between human users/customers of the applications and automated agents 138 of the TDMS 102 in the depicted embodiment. Individual ones of the automated agents 138 may for example may comprise respective threads of execution or processes running at one or more computing devices of the TDMS in some embodiments. At various stages of an interaction session initiated from a client-side dialog participation device 180 (such as 180A or 180B), respective sequences of natural language tokens generated by an entity using the dialog participation device may be detected, and a corresponding response may be identified and implemented by a run-time subsystem 130 of the TDMS 102. In some embodiments in which the natural language tokens are received as audio signals, the signals may be analyzed and transformed into text tokens, e.g., by voice-to-text converters or other I/O processors 134. One or more trained model(s) 114 may be executed using execution resources 132 of the run-time subsystem, with the results being used to identify the natural language portions of the responses and/or the actions that are to be taken as part of the responses.

In at least some embodiments, a response at a particular stage of an interaction session may require the use of resources external to the TDMS 102 – e.g., requests may be sent to one or more back-end action implementation services 160, such as 160A or 160B associated with applications A1 and A2 respectively, using application programming interface (APIs) supported by the back-end services. In the depicted embodiment, the run-time subsystem 130 may comprise one or more back-end action managers 136, implemented at one or more computing devices, that submit requests to the back-end implementation services as needed, receive results from those services, and/or provide an indication of the results to the automated agents for possible inclusion in the responses provided to the application users.

According to various embodiments, individual ones of the training examples in data sets 140 may comprise the responses identified for various stages of an interaction session by a trusted (e.g., human) agent. A given training data set may be used to train a machine learning model, such as a skip-connection sequence-to-sequence model comprising a plurality of LSTMs configured as a combination of an encoder and a decoder, to generate natural language token sequences and/or actions to be taken at various stages of a dialog, based on the current state and context of the dialog in various embodiments. The input received from an entity participating in the dialog may be processed using one or more encoder units in such embodiments, and the corresponding responses may be generated by one or more decoder units. The responses that the model generates may, at least for some training examples, differ from the actual responses made by the trusted agents and recorded in the training examples; the learned responses in some cases may for example be somewhat less fluent and/or less coherent than the responses generated by the trusted agents.

In at least some embodiments, instead of relying solely on the output generated by a skip-connection machine learning model (or some other similar model) in response to a given post-training input example, a somewhat different approach may be taken at run time, which still takes advantage of the learning achieved during the training of the model but is not limited using the exact outputs generated by the model. In one such embodiment, a plurality of state-response entries may be stored in a repository 150, e.g., after a skip-connection model has been at least partially trained. A particular state-response entry may in some embodiments indicate a mapping between (a) a representation of accumulated dialog state associated with one or more interactions of a particular dialog, obtained from a version of the model and (b) a corresponding response indicated in an example of the training data set which contains at least a portion of the particular dialog. In at least some embodiments, the accumulated state representation may comprise a vector of a fixed length (where the length is independent of the number of words or turns included in the dialog thus far), such as a 512-element numeric vector or a 1024-element numeric vector, which may be extracted from an internal portion of the skip-connection model such as one or more artificial neuron layers at the decoder and/or the encoder. The representation may be said to represent an accumulated state, rather than an instantaneous-only state, in that information about preceding stages or turns of the dialog may automatically be incorporated within the representation using techniques discussed below in further detail. In various embodiments, the size of the state representation (e.g., the length of the vector representing the state) may be a constant (a meta-parameter of the TDMS), independent of how many words or tokens were used in each of the interactions; as such, the length of the natural language token sequences may have limited or no effect on the amount of storage used for the accumulated state representation.

In effect, a given entry stored in the repository 150 may indicate the following: in those cases in which a dialog reached a particular accumulated state $S_i$, a trusted agent generated a response $R_i$. If, at run-time, an accumulated state $S_j$ sufficiently similar to $S_i$ is reached, the TDMS may decide to utilize the same response $R_i$, instead of using a response generated by the machine learning model in various embodiments. Accordingly, at run time, in response to determining that a particular sequence of input natural language tokens has been generated by an entity participating in the dialog, an automated agent 138 of the TDMS 102 may obtain a corresponding accumulated state representation from a trained model 114 (such as a skip-connection model), and then use that state representation to find a mapping entry in repository 150 with a similar state representation in some embodiments. If such a similar representation is found, the corresponding response indicated in the mapping entry may be implemented in various embodiments. In at least some embodiments, in order to find a similar mapping, a distance criterion may be employed – e.g., the Euclidean distance, Manhattan distance, or cosine distance between the state representation of the currently-in-progress dialog and the state representations associated with the entries in repository 150 may be obtained. In one embodiment, a nearest neighbor algorithm that uses such a distance metric may be employed - that is, from among a set of mapping entries of the repository 150, the nearest entry with respect to the state representation may be selected. In other embodiments, the first entry, among those examined at the repository, which falls within a distance threshold of the state representation of the in-progress dialog may be selected. In at least some embodiments, the repository 150 may be considered the logical equivalent of a key-value store, with the state representations considered the keys, and the training responses (the responses generated by trusted agents) representing the values corresponding to the keys. It is noted that a variety of storage devices may be used for the repository 150 in different embodiments – e.g., in some embodiments moveable disk-based storage devices may be used, while in other embodiments solid state drives (SSD) and/or main memory may be used.

In at least some embodiments, once the model(s) have been trained at the TDMS 102, they may be transmitted (e.g., along with at least a portion of the repository) to client-side dialog participation devices 180. In one embodiment, for example, at least some client-side devices 180, such as 180B, may comprise a local TDMS agent 182 responsible for performing at least some of the processing associated with dialogs involving the device. Such a local TDMS agent 182 may perform at least some of the operations of the run-time subsystem 130 that were described above in various embodiments – e.g., the dialog tokens detected locally may be converted into text if needed, a state representation may be obtained using a trained version of the model locally, a local repository may be accessed to find a sufficiently-similar or nearest-neighbor entry, and the response indicated in that entry (which may involve interaction with a back-end service 160) may be undertaken. In at least one embodiment, part of the work associated with a given stage of a given dialog may be performed using the local TDMS agent, while the remaining work may be performed with the help of non-local components of the TDMS – e.g., if a back-end action is to be implemented, a back-end action manager 136 may be requested to act as the intermediary to a service 160. A wide variety of client-side devices may be used in different embodiments, such as phones, voice-driven assistant devices, augmented reality devices, virtual reality devices, laptops, desktops and the like, some or all of which may be configured to communicate with the TDMS 102 using a set of programmatic interfaces 177 (such as a set of APIs).

In some embodiments in which a neural network model comprising an encoder and a decoder is used to generate the state representations, respective per-interaction encoders and decoders may be used during model training, but only a single encoder and a single decoder may be used at runtime after training is completed. Thus, if a given dialog comprises five interaction stages or "turns", and in each turn an application user provides some natural language input sequence (or silence, which may also be considers a natural language input) and the automated agent also generates some natural language input sequence, five (encoder, decoder) pairs may be used during training, but only one (encoder, decoder) pair may be used post-training at run-time. In at least some embodiments, a skip-connection technique may be employed during training as described below, in which a vector generated at an encoder module corresponding to a particular stage of a dialog (e.g., at the $k^{th}$ stage or turn) may be included in the input provided to one or more modules used for the next stage (e.g., to the encoder of the $(k+1)^{th}$ stage or turn).

Example Task-Oriented Dialog

FIG. 2 illustrates an example sequence of interactions of a task-oriented dialog between an entity and an artificial agent implemented at a task-oriented dialog management service, according to at least some embodiments. In the depicted embodiment, the example problem domain or application being considered relates to customer support for a service which offers free trial memberships to some or all features of the service for limited time periods, such as various network-accessible services available on the Internet including music streaming services, video streaming services, discounted shopping services and the like. After the free trial membership period ends, a customer who signed up for the service and has not canceled the membership may be charged for the membership. In the example scenario shown, a customer has determined that a charge was applied, even though the customer did not intend to get charged (whether the customer actually attempted to cancel the membership, or not, is not relevant to the concepts being illustrated). Vocalized interactions are assumed, and the steps of converting voice to text (in the case of utterances of the application customer) or text to voice (in the case of the automated TDMS agent's responses) are not illustrated.

Six example interactions or "turns" of the dialog are shown. Column 201 indicates the sequence or turn number of the interaction, column 202 indicates the utterance of an entity (an application customer) participating in the dialog with an automated agent of the task-oriented dialog management service, while column 204 indicates the responses of the automated agent. In several of the example interactions, as in interaction #2 and interaction #4, one of the dialog participants (the customer) may not necessarily provide any natural language tokens, as indicated by the label <Silence> instead of actual utterances 204B and 204D. (Silences may be treated as a special category of sequences of natural language tokens in some embodiments.) The responses of the automated agent may include natural language tokens (as shown in each of the responses 206A – 206F), and in some cases may include other actions (as in the case of response 206D, which comprises the words "I will now cancel your membership" as well as an API call to cancel and refund the membership of the customer).

Example responses of the kind shown in FIG. 2, which represent a high level of fluency and coherence, may be generated using the hybrid technique discussed earlier in some embodiments. For example, in one embodiment, as the input natural language tokens (or the silence) of the customer utterances 204A – 204F are detected at each stage and processed using a neural network model, an accumulated dialog state representation corresponding to the current state of the dialog may be obtained from an internal portion or layer of the model (e.g., comprising respective vectors generated at a stage of a decoder and/or encoder). A different state representation may be obtained after the input from the dialog participant is analyzed at each interaction: e.g., state representation SR1 may be obtained with respect to interaction #1, state representation SR2 may be obtained with respect to interaction #2, and so on. Individual ones of the state representations may be used to identify respective state-response entries in the stored mapping repository which meet a distance or similarity criterion, and the corresponding responses in those entries may be implemented as response 206A – 206F. The actual output of the model (which was trained at least in part to generate appropriate responses to the dialog participant's utterances) at each interaction stage may not correspond to the response implemented in the depicted embodiment - instead, responses from the training data (that were stored as part of the mappings), corresponding to similar states to those attained in the dialog being processed, may be used.

Hybrid Methodology for Generating Dialog Responses

Figure 3:
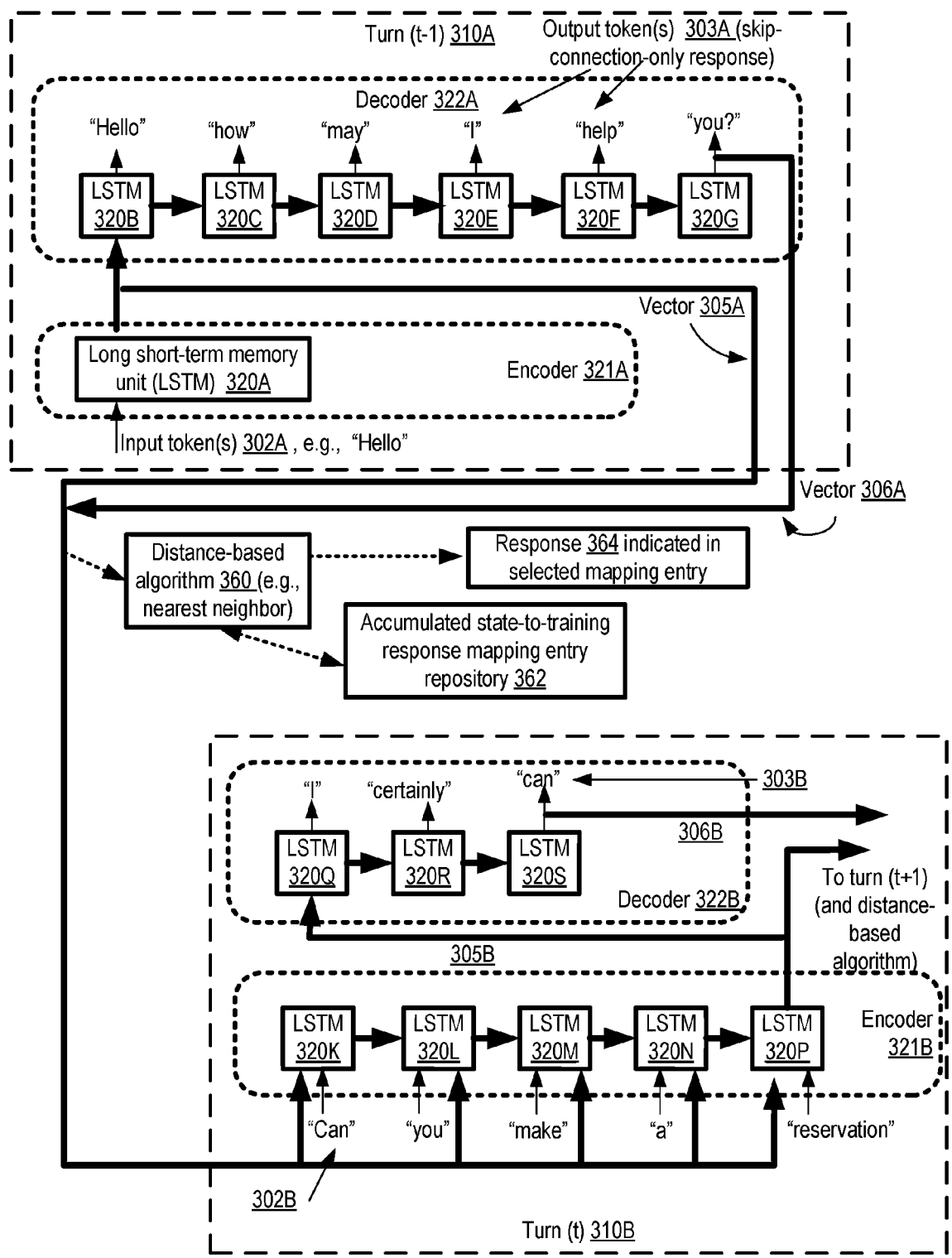
FIG. 3 provides a high-level overview of aspects of a hybrid technique which may be employed for task-oriented dialog management, in which accumulated dialog state information obtained from a machine learning model may be used to look up mapping entries from which dialog responses may be identified, according to at least some embodiments.

FIG. 3 provides a high-level overview of aspects of a hybrid technique which may be employed for task-oriented dialog management, in which accumulated dialog state information obtained from a machine learning model may be used to look up mapping entries from which dialog responses may be identified, according to at least some embodiments. In the depicted embodiment, a recurrent neural network model called a skip-connection sequence-to-sequence model comprising a collection of long short-term memory units (LSTMs) may be trained to generate an output natural language token sequence corresponding to a given input natural language token sequence detected during a given turn or interaction of a multi-interaction dialog. A respective instance of an encoder unit comprising one or more LSTM units, and a corresponding decoder unit comprising one or more LSTM units may be employed for each interaction or stage of the dialog during training in the depicted embodiment, as shown in FIG. 3.

Input and output sequences generated with respect to two successive interactions – turn (t-1) 310A, and the next turn of the dialog (turn 3) 310B are shown. In turn (t-1), the input tokens 302A comprise a single word "Hello", provided as input to an LSTM 320A of encoder instance 321A. An output vector 305A may be produced by the final LSTM (in this case the only LSTM) of the encoder, and passed to several other portions of the model. Firstly, the output vector may be passed to the decoder 322A for turn (t-1), which may comprise a plurality of LSTM units 320B – 320G which collectively generate the output token sequence 303A "Hello how may I help you?", with one word being produced as output by each of the decoder LSTMs in the depicted embodiment. The output tokens 303A may represent the output of the skip-connection model by itself, with regard to turn (t-1) in the depicted embodiment.

Secondly, the encoder 321A's output vector 305A may be provided (along with a vector 306A obtained from a layer of decoder 322A) as input to each of the LSTM cells (320K, 320L, 320M, 320N and 320P) of the encoder instance 321B used for turn (t) (the next interaction of the dialog). The input tokens uttered by the dialog participant in turn (t) comprise the five words "Can you make a reservation" in the depicted example, each of which is provided as input to a particular LSTM of encoder 321B. An output vector 305B produced by final LSTM (320P) of the encoder 321B is provided as input to the LSTM 320Q of decoder 322B for turn (t), and is also passed on (along with a decoder vector 306B produced in turn t) to the encoder instance for turn (t+1) in the depicted embodiment. The output sequence 303B generated at turn t by the skip-connection model alone comprises the tokens "I", "certainly" and "can" in the depicted example.

The inclusion of the previous interaction's encoder vectors 305 and the decoder vectors 306 in the input provided at each stage of the dialog may help to retain cumulative information about previous stages of the interaction in the depicted embodiment. Furthermore, as shown, the combination of the decoder's final LSTM output 306 and the encoder's final LSTM output 305, which may be considered a representation of accumulated state of the dialog, may be used as input to a distance-based algorithm 360 (such as a nearest neighbor algorithm) in the depicted embodiment. Using such an algorithm, an entry representing a similar accumulated dialog state (e.g., with a similar combination of encoder and decoder output vectors) may be identified from a repository 362 in the depicted embodiment, and a response 364 indicated in the selected mapping entry may be implemented (e.g., which may at least in some cases differ from the output sequences generated by the skip-connection models alone, such as sequences 303A at turn (t-1) and 303B at turn (t)).

In the embodiment depicted in FIG. 3, vectors generated at the final LSTM layers of the encoder and decoder for a given interaction are used collectively (for example via concatenation, although other techniques for combining may be used in some embodiments) as representations of the accumulated dialog state. It is noted that the vector sizes may be independent of the number of words or natural language tokens that are consumed as input, or generated as output, in any given turn in the depicted embodiment. In other embodiments, only the decoder vectors 306 may be used to represent the accumulated dialog state, or only the encoder vectors 305 may be used to represent the accumulated dialog state. In some embodiments, state representations may not necessarily be extracted from the final LSTM of the encoder and/or decoder – instead, for example, the outputs produced by more than one LSTM of the decoder and/or the encoder may be used. In embodiments in which neural network models that do not comprise LSTMs are employed, vectors generated at one or more hidden layers of the models may be used as state representations. Additional details regarding the internal elements of LSTM units that may be used for encoders and/or decoders in various embodiments, and the connections between the encoders and decoders, are provided below.

LSTM Basics

Figure 4:
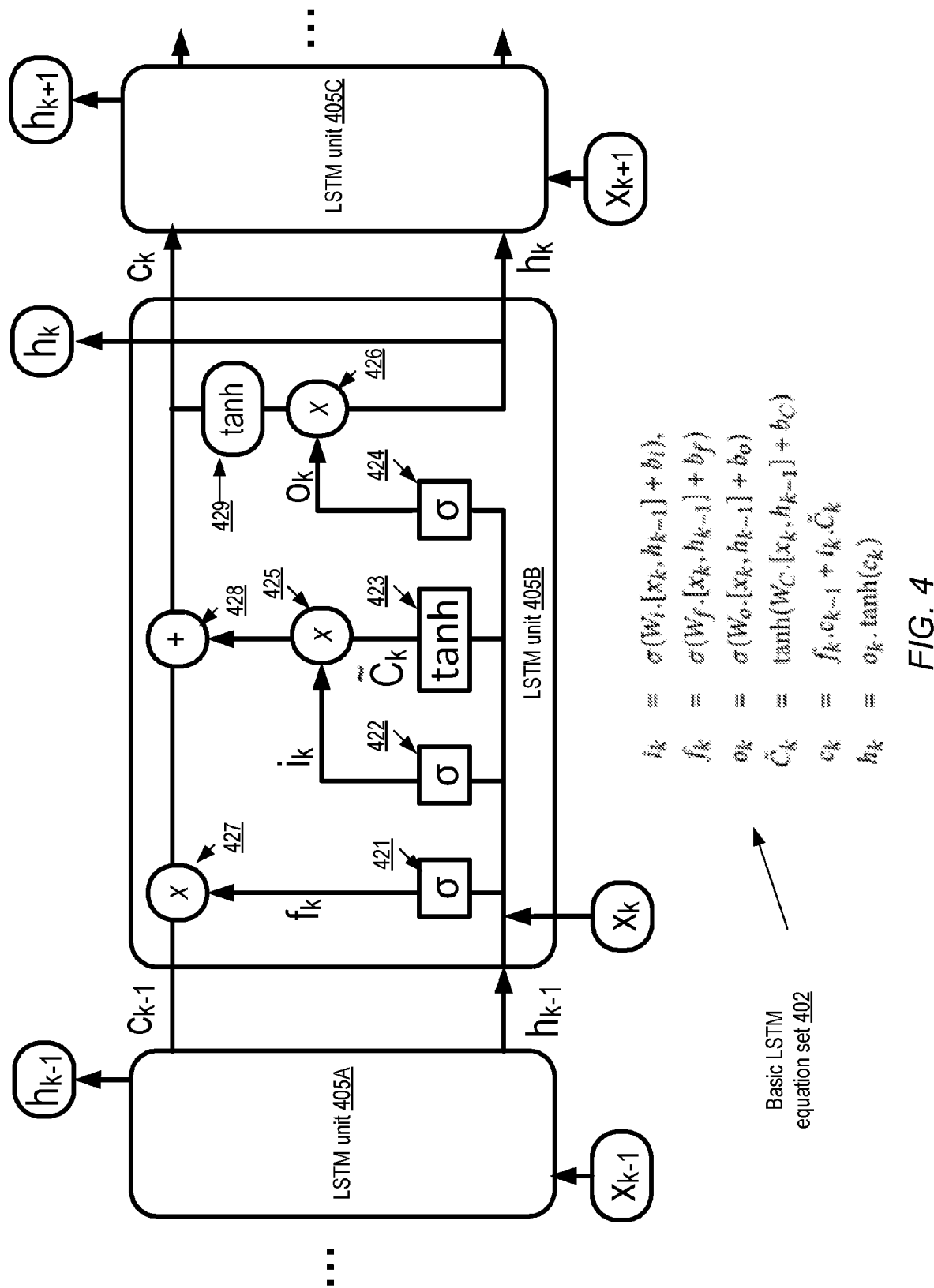
FIG. 4 illustrates an overview of a basic long short-term memory unit (LSTM) which may be employed in various types of neural-network based machine learning models, according to at least some embodiments.

As mentioned above, in at least some embodiments, recurrent neural networks comprising long-short-term memory units (LSTMS may be employed to help generate dialog responses. FIG. 4 illustrates an overview of a basic long short-term memory unit (LSTM) which may be employed in various types of neural-network based machine learning models, according to at least some embodiments. It is noted that the architecture shown in FIG. 4 may not necessarily be used in some embodiments for task-oriented dialog management; instead, other recurrent neural network units or modules such as variants of LSTMs may be employed.

In various embodiments, multiple LSTM units or modules may be chained in individual subnetworks (such as encoders or decoders of the skip-connection models shown at a high level in FIG. 3). In the depicted example architecture shown in FIG. 4, details of the internal organization of one recurring LSTM unit 405B are displayed; the other LSTM units such as 405A or 405C may be assumed to have similar internal structures. Equation set 402 indicates the relationships between inputs, outputs and internal variables or quantities of a given LSTM unit in the depicted embodiment.

Each LSTM unit 405 may consume as input an input vector $x_k$ (where the index label k represents a particular index or time step within a sequence or series, such as the successive words making up the utterance of a dialog participant) comprising one or more elements, and produce a respective output vector $h_k$ comprising one or more elements. Thus, the inputs of the units LSTM 405A, 405B and 405C comprise $x_{k-1}$, $x_k$, and $x_{k+1}$ respectively, and the outputs of the LSTM units 405A, 405B and 405C comprise the respective vectors $h_{k-1}$, $h_k$ and $h_{k+1}$. A state c is associated with each of the units – e.g., state $c_{k-1}$ represents the state of unit 405A, while $c_k$ represents the state of unit 405B in the depicted embodiment.

Within each LSTM unit 405, four groups of artificial neurons or nodes may be configured in the depicted embodiment, corresponding to elements 421, 422, 423 and 424 of FIG. 4. In each LSTM unit, information may be added to or removed from the state c, regulated by three structures which may be referred to as respective gates. Individual gates may comprise, for example, a sigmoid neural network layer (such as 421, 422, or 424) and one or more pointwise operations (such as multiplicative operations represented by elements 427, 425, or 426 respectively). A sigmoid neural network layer may output numerical values between 0 and 1, controlling how much of each of its inputs is to be included in its output(s).

The first of the three gates of the LSTM unit 405B in the depicted embodiment comprises sigmoid layer 421 and multiplicative operation 427, and may be referred to as the "forget gate". In effect, in the forget gate, based on $h_{k-1}$ and $x_k$, a respective value $f_k$ between 0 and 1 may be produced, corresponding to each element of the state $C_{k-1}$ vector, and then multiplied with that element of $C_{k-1}$. "Input gate" sigmoid layer 422 may be used to identify various elements of the input $h_{k-1}$ and $x_k$ which are multiplied with the output of a tanh layer 423 (at multiplicative operation 425) and added to the state information using pointwise addition operation 428. Sigmoid layer 424 of an "output gate" (which also takes $h_{k-1}$ and $x_k$ as input) and tanh operation 429 (applied to the modified state information $c_k$) collectively determine the output $h_k$ of the LSTM unit 405B. Respective sets of weights, represented by the "W" terms in equation set 402 may be learned for each of the four neural network layers 421, 422, 423 and 424 during training in various embodiments. The "b" terms in equation set 402 represent bias input terms for the various gates.

Skip-Connection Model

Figure 5:
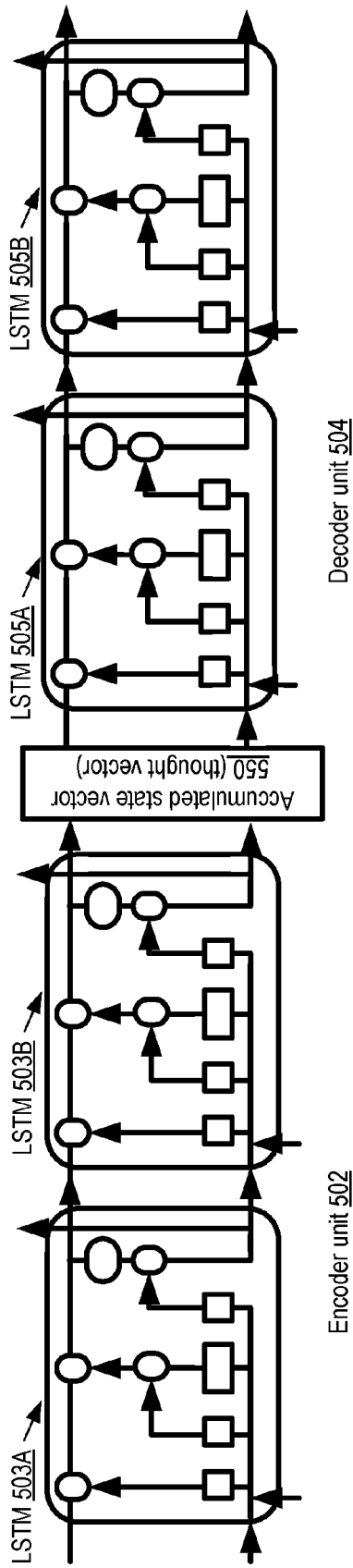
FIG. 5 illustrates a high-level overview of a skip-connection model comprising LSTM-based encoder and decoder units which may be employed to help determine dialog responses, according to at least some embodiments.

FIG. 5 illustrates a high-level overview of a skip-connection model comprising LSTM-based encoder and decoder units which may be employed to help determine dialog responses, according to at least some embodiments. In the depicted embodiment, an encoder unit 502 comprising two LSTMs 503A and 503B arranged in a sequence (e.g., to handle two words of an input sequence of natural language tokens) is shown by way of example, and a decoder unit 504 also comprising two LSTMs 505A and 505B arranged in a sequence (e.g., to generate recommended successive words of a natural language response to the input) is shown by way of example. In various embodiments, either unit (encoder or decoder) may comprise any desired number of LSTM units, e.g., up to some maximum sequence length selected as a meta-parameter of the algorithm for which the encoder/decoder combination is being used. During training of the skip-connection model to help select responses to be provided during respective turns or interactions of a multi-interaction dialog, a respective encoder instance and decoder instance may be trained for each turn or interaction.

The basic LSTM equations shown in the context of FIG. 2 may be modified to implement a skip-connection model for multi-interaction dialog management in various embodiments, resulting in the skip-connection versions 510 shown in FIG. 2. The notation used in the encoder equations 512 and the decoder equations 514 may be summarized as follows. The equations may be made interaction-specific or turn-specific by adding superscripts: e.g., the superscript t in $i^t_{k,enc}$ indicates the $t^{th}$ interaction, while the superscript t-1 (as in $h^{t-1}_{L',enc}$) indicates the (t-1)$^{th}$ interaction or turn. The equations 512 for the encoder unit are labeled with the subscript "enc", while the equations 514 for the decoder unit are labeled with the subscript "dec". L indicates the maximum number of words in the utterances of the user with whom a dialog is being conducted using an automated agent, while L' indicated the maximum number of words in the responses generated by the automated agent in the depicted embodiment.

An accumulated state vector 550, obtained from the final layers of the previous interaction's encoder may be included in the input of each of the LSTMs of the encoder of the current interaction in the skip-connection model in at least some embodiments. This is represented by the term $h^{t-1}_{L,enc}$, within the square brackets of several of the encoder equations shown in FIG. 5. This vector may also be referred to as a thought vector or a context vector in some embodiments. Because this vector is transmitted directly from the encoder for one interaction to the encoder for the next interaction (e.g., instead of the normal flow on information via the decoder alone), skipping the decoder, a model governed by an equation set similar to 510 may be referred to as a "skip-connection" model in various embodiments. In at least some embodiments, a belief state with respect to a given interaction or turn t may be obtained by concatenating $h^{t-1}_{L,enc}$, and $h^{t-1}_{L',dec}$ (from the previous interaction) with the user input $x_t$ for the current interaction. This approach may ensure that a fixed size vector can be used to represent the accumulated dialog history or belief state at every interaction or turn, and may enable parameter sharing across interactions and dialogs in at least some embodiments.

State-Response Mapping Entries

Figure 6:
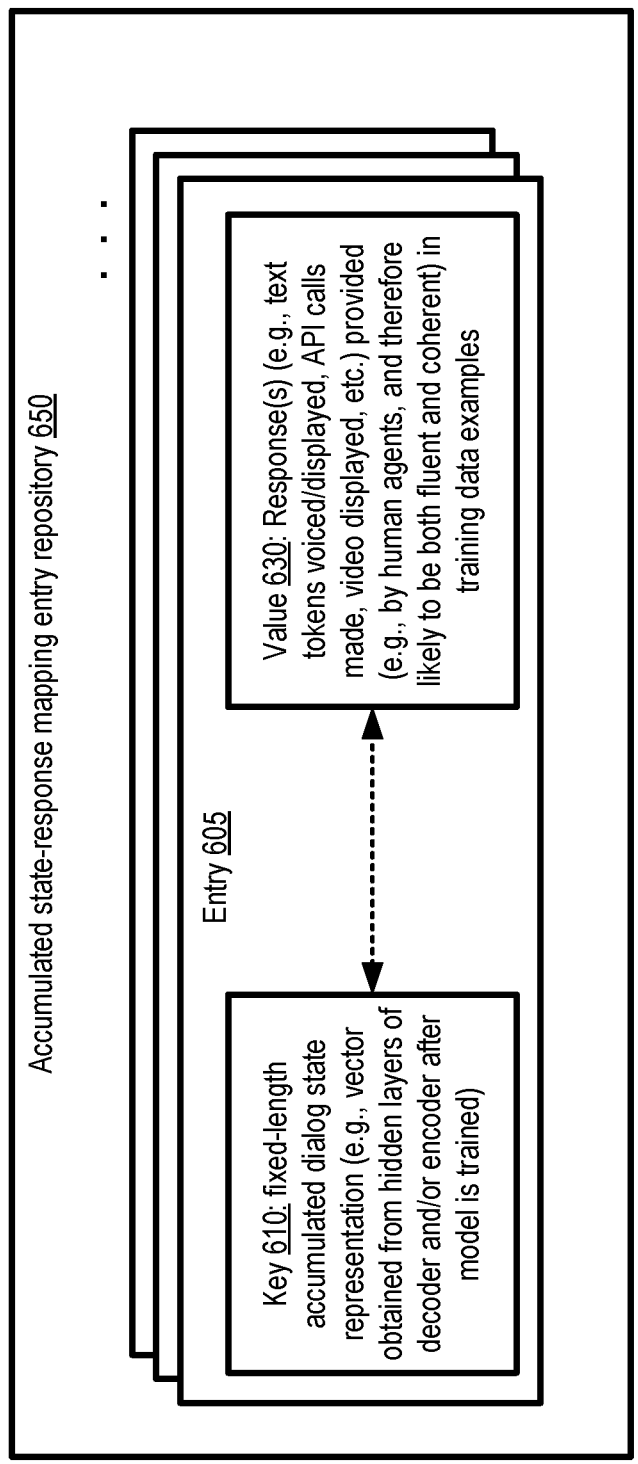
FIG. 6 illustrates an example of the kind of state-to-response mapping entries that may be used in some embodiments, according to at least some embodiments.

In various embodiments, state information extracted from neural-network based models of the kind discussed above may be used to generate mappings which can in turn be used to select responses to be provided at various stages of a multi-interaction dialog. FIG. 6 illustrates an example of the kind of state-to-response mapping entries that may be used in some embodiments, according to at least some embodiments.

In the depicted embodiment, a plurality of entries 605 may be stored in a repository 650 accessible from a dialog management service. As mentioned earlier, a variety of storage technologies may be employed for the repository in different embodiments, such as movable disk-based devices, solid state devices, main memories of one or more computing devices, and so on.

A given entry 605 stored in the repository may be thought of as representing a mapping or relationship between a key 610 and a corresponding value 630 in some embodiments; that is, the repository may be considered a type of key-value data store. A given key 610 may comprise a fixed length accumulated dialog state representation in various embodiments, such as may be obtained from vectors produced at one or more hidden layers of an encoder/decoder pair after a model similar to the skip-connection model discussed above is trained. In some embodiments, the key 610 may comprise a concatenation (or some other aggregation) of vectors produced at an encoder and a decoder; in other embodiments, the key 610 may comprise a vector produced at a decoder alone, or an encoder alone. In at least one embodiment, a vector (e.g., similar to the output vectors $h^t_{L,enc}$ or $h^t_{L',dec}$ introduced in the context of FIG. 5) generated at the last or ultimate LSTM of an encoder or decoder during a particular interaction may be used to represent the accumulated state of the dialog up to that point of the dialog. In other embodiments, the vector may not necessarily be extracted from the final LSTM of the encoder or decoder (e.g., vectors produced at earlier LSTMs of an encoder or decoder may be used).

A value 630 stored for a given key 610 may comprise information obtained from the training examples of the data set used to train the model from which the keys were extracted in various embodiments. For example, the value may indicate one or more properties of the response that was generated by a human (or other trusted) agent in response to the most recent natural language token sequence obtained from a dialog participant when the dialog state represented by the key 610 was attained, where the response was recorded as part of a training example. A given response may comprise one or more text tokens (or a period of silence), one or more API calls or other invocations of services/applications by the human or trusted agent, one or more videos that may have been displayed or audio excerpts that may have been played, and so on, in various embodiments. Because the responses stored in the entries 605 may have been generated by human agents and/or trusted automated agents, they may be assumed to be (at least in some cases) no less fluent and no less coherent than the responses that would have been generated by the trained model alone. As such, if a state of a dialog being conducted (as determined by a trained skip-connection or similar model) is found to be very similar to a state for which a key-value entry is already stored in the repository, the response stored in that entry may be implemented (e.g., in preference to the response generated by the model alone) in at least some embodiments. It is noted that data models other than the key-value model illustrated in FIG. 6 may be employed for the state-response mapping entries in some embodiments. For example, in one embodiment a relational database record containing the dialog state representation as one of its columns and response information in one or more other columns may be stored to represent each of the mappings.

Parallel Execution of Multiple Models

Figure 7:
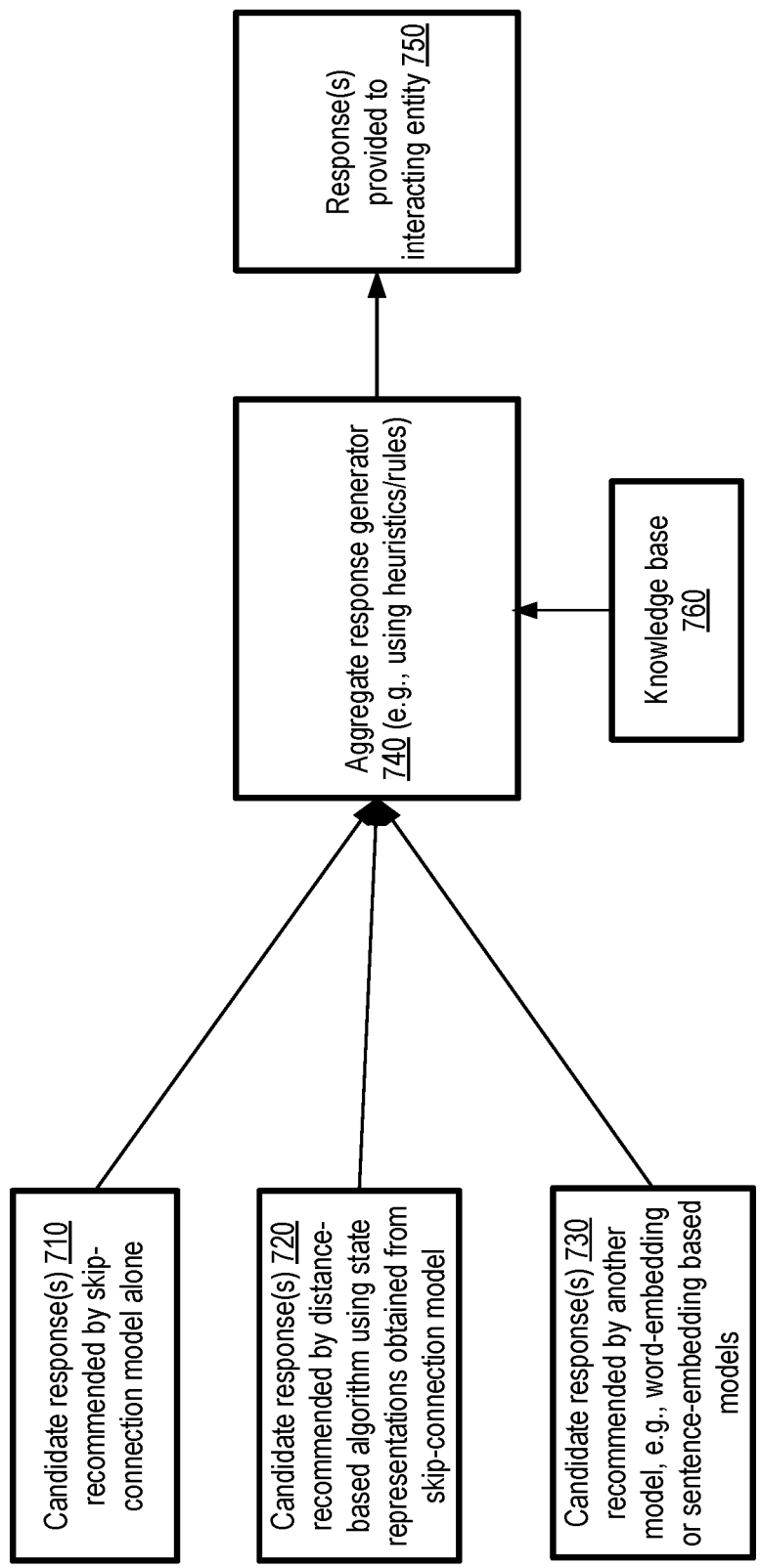
FIG. 7 illustrates an example approach in which dialog interaction responses may be selected based on output generated using several different machine learning algorithms, according to at least some embodiments.

In at least some embodiments, after a machine learning model is trained, the amount of time or resources required to execute the model for a given input example may be quite small. Accordingly, in some embodiments, at run-time (after the models have been trained) several alternative models may be used to recommend responses to a particular set of input received during a dialog, and the results of the different models may be used to identify a particular response that is implemented. FIG. 7 illustrates an example approach in which dialog interaction responses may be selected based on output generated using several different machine learning algorithms, according to at least some embodiments.

In the depicted embodiment, respective candidate responses to be provided during a given stage or interaction of a dialog may be obtained using at least three models or techniques in parallel. Such a combination of models may be referred to as an ensemble in various embodiments. Candidate response 710, for example, may be obtained using a trained skip-connection model of the kind discussed above – e.g., a response 710 may comprise the output token sequence produced by a decoder of the skip-connection model. Candidate response(s) 720 may be obtained using a distance based algorithm of the kind also discussed above, where an accumulated state representation vector obtained from a skip-connection or similar model is used as a key to look up a state-to-response mapping entry whose state is similar, and the response indicated in that entry is produced as output. Candidate response(s) 730 may be produced using a third model, such as a model which uses word embeddings or sentence embeddings of the input tokens to identify the response to be provided at a given stage of a dialog.

The candidate responses generated by the various trained models may be examined at an aggregate response generator 740 in the depicted embodiment, which may for example employ a set of experience-based heuristics or rules to determine the aggregate or actual response 750 to be implemented for the current stage of the dialog. In some embodiments, a knowledge base 760 with entries indicating the relative success of the responses generated by the different types of models for various types of application stages may be consulted, for example, to help select the right response, or to combine the recommendations appropriately to generate the aggregate response for implementation. In one embodiment, for example, based on experimental analysis, it may be determined that when a response that comprises an external action (such as an invocation of an API) is to be provided, the recommendations of the skip-connection model alone may be superior to those of the other models; as a result, in those interactions in which at least the skip-connection model recommends an invocation of an API, that API may be invoked. In other embodiments, it may be determined over time that the skip connection model's recommendations are inferior (with respect to one or more coherency or fluency metrics) to the distance-based model's recommendations when the number of interactions or turns exceeds a threshold, so recommendations 720 may be preferred to recommendations 710 for longer interaction sessions. In at least one embodiment, some final responses may comprise a combination of individual responses recommended by more than one model. Other types of models may also be used in at least some embodiments, in addition to or instead of one or more of the types of models shown in FIG. 7. At least in some embodiments, the models may be run at least partially in parallel, e.g., using respective sets of computing resources.

Provider Network Environment

Figure 8:
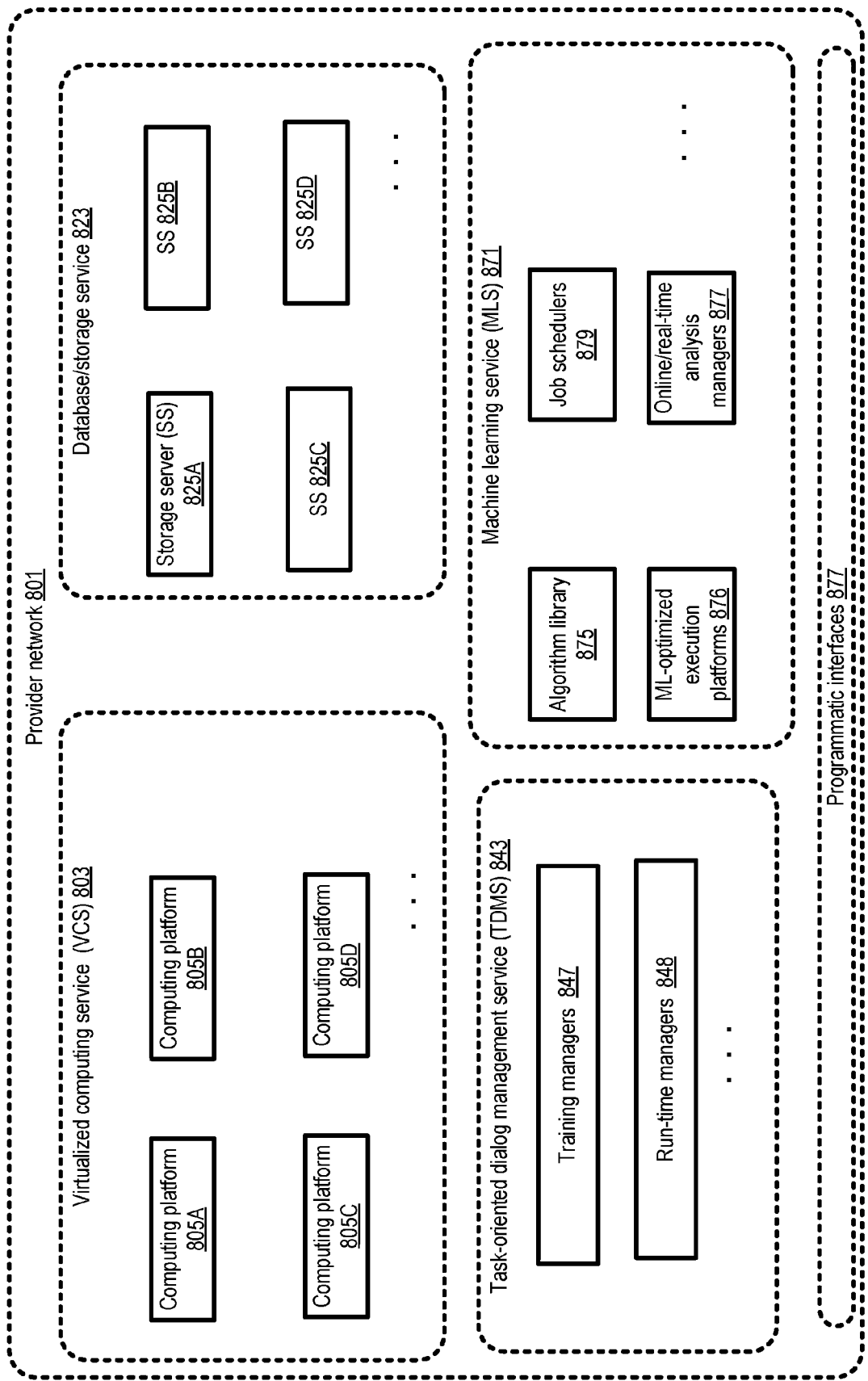
FIG. 8 illustrates a provider network environment at which a task-oriented dialog management service may be implemented, according to at least some embodiments.

In some embodiments, task-oriented dialog management may be performed at least in part using resources of a provider network. FIG. 8 illustrates a provider network environment at which a task-oriented dialog management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 801 may comprise resources used to implement a plurality of services, including for example a virtual computing service (VCS) 803, a database or storage service 823, a machine learning service (MLS) 871 and a task-oriented dialog management service (TDMS) 843. In some embodiments, the TDMS 843 may be implemented as a subcomponent of the MLS 871. Components of a given service may utilize components of other services in the depicted embodiment – e.g., for some machine learning tasks, a component of the machine learning service 871 may utilize virtual machines implemented at computing platforms such as 805A – 805D of the virtualized computing service. Input data, intermediate results, final results and/or other artifacts of various machine learning algorithms or models, such as those used for dialog management, may be stored at storage servers 825 (e.g., 825A – 825D) of the database or storage service 823 in some embodiments. Individual ones of the services shown in FIG. 8 may implement a respective set of programmatic interfaces 877 which can be used by external and/or internal clients (where the internal clients may comprise components of other services) in the depicted embodiment.

As shown, TDMS 843 may comprise, among other components, one or more training managers 847 and/or run-time managers 848 in the depicted embodiment. The training managers 847 may, for example, invoke algorithms selected from the machine learning algorithm library 875 in the depicted embodiment, including the skip-connection algorithms and distance-based algorithms of the kinds described earlier. In some embodiments, requests to train some types of machine learning models (such as skip-connection models) may be handled as batch jobs at the machine learning service, and a batch job scheduler 879 may orchestrate the allocation of resources for the jobs as well as dependencies among jobs. In the depicted embodiment, online/real-time analysis managers 877 of the MLS 871 may be responsible for executing trained models on behalf of the run-time managers 848 of the TDMS 843. In at least one embodiment, a machine learning service 871 may have access to or include a set of execution platforms 876 that are optimized for machine learning tasks (e.g., platforms that have customized hardware such as GPU arrays and/or customized software stacks). Depending on the suitability of such platforms for dialog management tasks, one or more execution platforms 876 may be employed for such tasks in the depicted embodiment.

In at least some embodiments, the techniques discussed for dialog management may be accomplished using non-specialized computing platforms of the virtualized computing service 803. In various embodiments, at least some of the training and test/evaluation data used for various models for generating responses at various stages of dialogs, and/or the state-response mappings of the kind discussed earlier, may be stored at a database/storage service 823. The techniques for dialog management described above may be implemented without acquiring resources of network-accessible services such as those shown in FIG. 8 in at least some embodiments. For example, a standalone tool implemented at one or more computing devices which are not part of a network-accessible service may be used in some embodiments.

Figure 9:
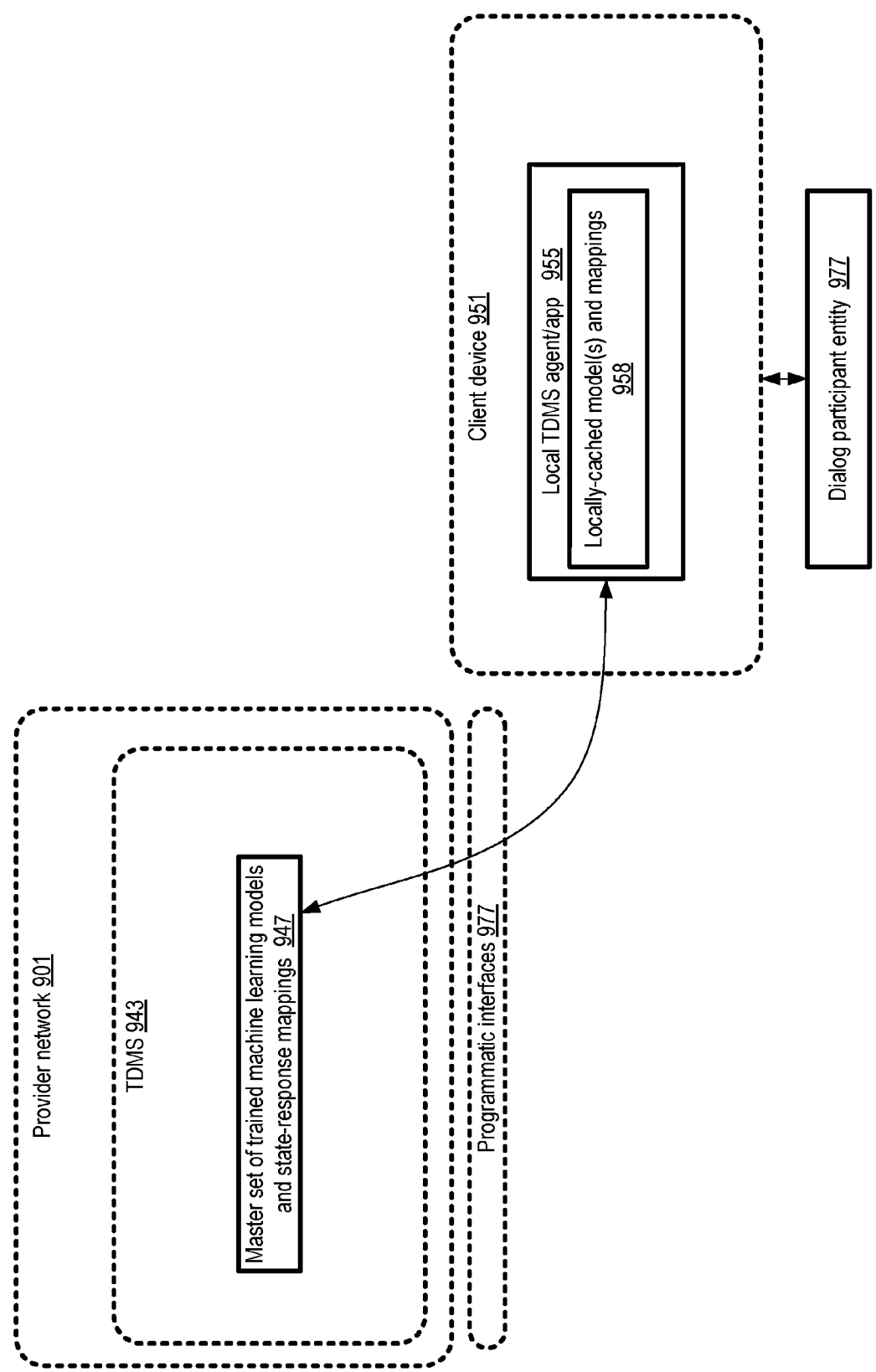
FIG. 9 illustrates an example deployment of machine learning artifacts for dialog management at a small-footprint client device, according to at least some embodiments.

In some embodiments, dialog management may be accomplished using a combination of provider network and external resources. FIG. 9 illustrates an example deployment of machine learning artifacts for dialog management at a small-footprint client device, according to at least some embodiments. A client device 951 may be referred to as being small-footprint as it may have a smaller set of computing resources (such as processors, cores, memory and the like) than is available at individual servers of the provider network.

A client device 951 may comprise, for example, a personal assistant device, a smart phone, a tablet computing device, an augmented reality/virtual-reality device, an Internet-of-Things (IoT) device such as a smart thermostat, a smart refrigerator or the like. As shown, the client device 951 may comprise a local TDMS agent or application 955 which comprises a cache of trained model(s) and mappings which may be transferred via programmatic interfaces 977 of a TDMS 943 of the provider network 901. The TDMS 943 may for example comprise a master set of trained machine learning models and state-response mappings 947 in the depicted embodiment, and at least a subset of the master set may be cached at a given time at the client device.

A dialog may be initiated by a participant entity 977 (such as a user or customer of a dialog-driven application) using the client device 951. At various stages or interaction steps of the dialog, the locally cached model(s) and mappings may be used to identify a response to be provided to the entity in the depicted embodiment. In at least some embodiments, it may sometimes be the case that the initial response selected for a particular interaction at the local TDMS agent or application 955 fails to meet a desired quality criterion. In such a scenario, in some embodiments, the resources of the provider network may be accessed to identify the response that is ultimately provided to the entity 977. In one such embodiment, for example, the locally cached mappings may represent a subset of the mappings stored at a provider network repository. If a nearest-neighbor algorithm of the kind described above fails to find an entry whose accumulated state representation lies within a threshold distance of the accumulated state representation of the interaction for which a response is to be provided, a search may be conducted among a larger set of mappings stored at a provider network repository, or additional models may be executed at the provider network to try to find an appropriate dialog response.

Methods for Generating Responses During Task-Oriented Dialog Sessions

Figure 10:
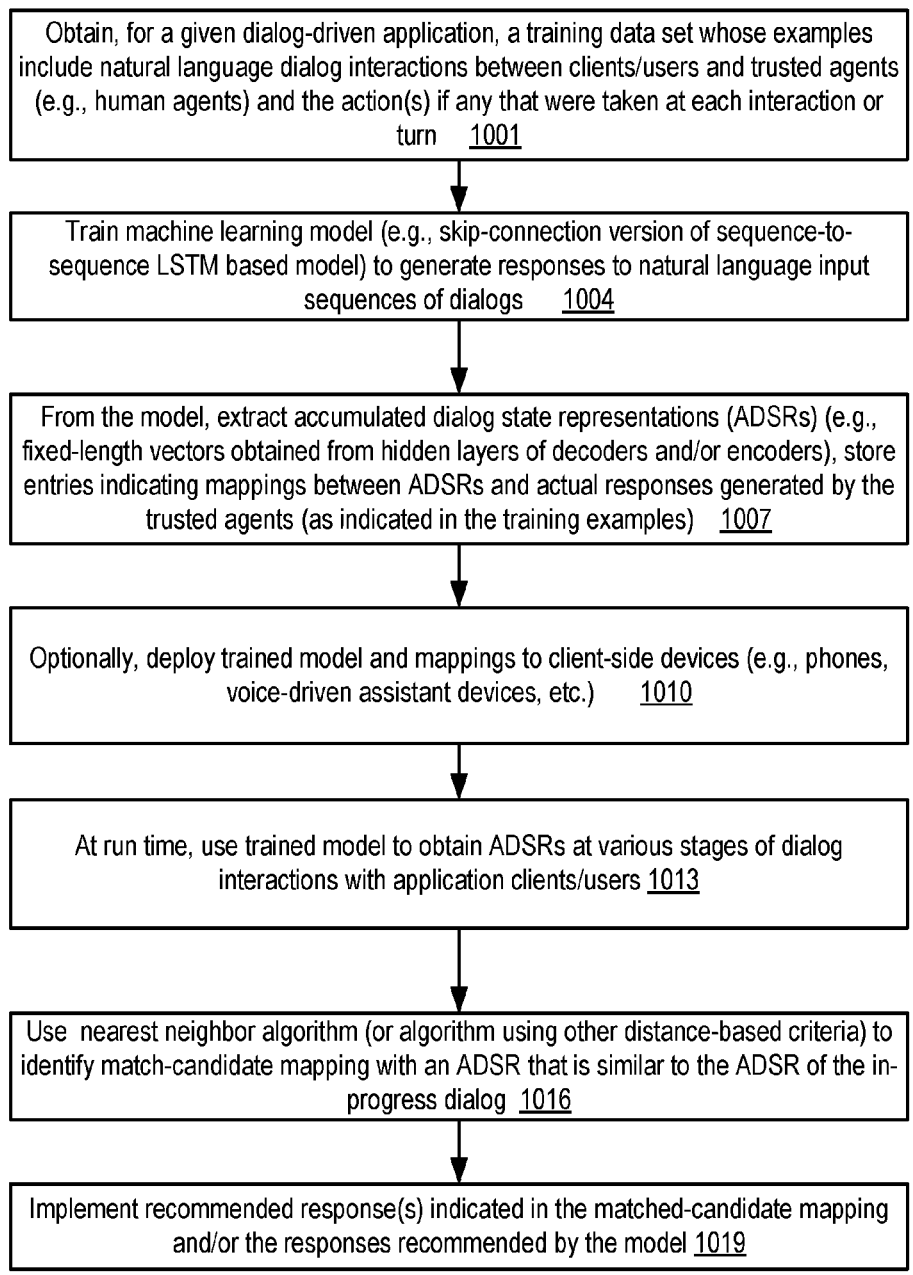
FIG. 10 is a flow diagram illustrating aspects of operations that may be performed for task-oriented dialog management, according to at least some embodiments.

FIG. 10 is a flow diagram illustrating aspects of operations that may be performed for task-oriented dialog management, according to at least some embodiments. As shown in element 1001, for a given dialog-driven application, a training data set whose examples include natural language dialog interactions between clients/users and trusted agents (e.g., human agents) and the external action(s) (e.g., API calls and the like) if any that were taken at each interaction or turn may be obtained, e.g., at one or more computing devices of a network-accessible task-oriented dialog management service. It is noted that in at least one embodiment, the training data set may include records of interactions between application customers and automated agents that have provided fluent and coherent responses; not all the trusted agents whose responses are used for training may necessarily be human agents.

One or more machine learning models (e.g., neural network based models, such as a skip-connection version of a sequence-to-sequence LSTM based model) may be trained in various embodiments using the training examples to generate responses to the natural language input sequences of dialogs (element 1004). In at least some embodiments, the models may include encoders which process the input natural language token sequences received from an application user or customer, and decoder units which consume internal encodings of the input that were generated by the encoder and produce corresponding sequences of natural language tokens (and/or representations of external actions) as output. In some embodiments, several different types of models, including models which rely on word embeddings of the input or sequence embeddings of the input to generate corresponding responses, may be trained.

From the trained model(s), internal accumulated dialog state representations (ADSRs) or state encodings (e.g., fixed-length vectors obtained from hidden layers of decoders and/or encoders) may be extracted (element 1007) in at least some embodiments. Respective entries indicating mappings between ADSRs and actual responses generated by the trusted agents (as indicated in the training examples) may be stored, for example in a repository accessible from a dialog management service.

Optionally, in some embodiments, one or more of the trained models and at least a portion of the mapping entries may be deployed to and cached at various client-side devices, such as phones, voice-driven assistant devices, and so on (element 1010). In some cases, only a subset of the mappings may be cached locally at the client devices, while in other embodiments, all the mappings corresponding to a given training data set may be cached.

At run time, the trained model may be used to obtain ADSRs corresponding to various stages of an in-progress dialog with a client or user of the application (element 1013) in various embodiments. A nearest neighbor algorithm (or algorithms using other distance-based criteria) may be used to identify a match-candidate mapping from among the previously-stored mappings, such that the current state of the in-progress dialog is similar to the state indicated in the match-candidate mapping (element 1016) in at least some embodiments. A goal of this matching may comprise, in effect, determining whether a similar dialog state was attained in at least some training example, and identifying the response that was implemented by a trusted agent in the similar state. In at least some embodiments, one or more responses indicated in the match-candidate mapping entry may be implemented (element 1019). In at least one embodiment, the responses recommended by the trained version of the machine learning model may also be considered for implementation, and in some cases implemented in preference to (or together with) the responses obtained using the match-candidate entry identified using distance computations.

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations.

Use Cases

The techniques described above, of utilizing a hybrid technique that includes the use of a distance-based algorithm as well as a neural-network based machine learning model to determine responses provided during various stages of a multi-interaction dialog may be useful in a variety of scenarios. As natural language processing algorithms become more powerful and affordable, more and more applications may be activated or accessed via spoken dialogs. Such applications may include, for example, customer support applications, travel planning applications, food and retail purchasing applications, medical diagnosis applications and the like. In order for such applications to succeed, the quality of the responses provided, both in terms of the naturalness and appropriateness of the language used, and in the correctness of any external actions taken, may be key. Unfortunately, the language generated by even the more sophisticated neural network-based machine learning models by themselves may in many cases not be sufficiently fluent to satisfy customer requirements. Using mappings between accumulated dialog states and the actual responses generated by trusted human agents to select the response language as described, responses that are as good as (or close to as good as) those that could have been provided by human agents may be identified.

Illustrative Computer System

Figure 11:
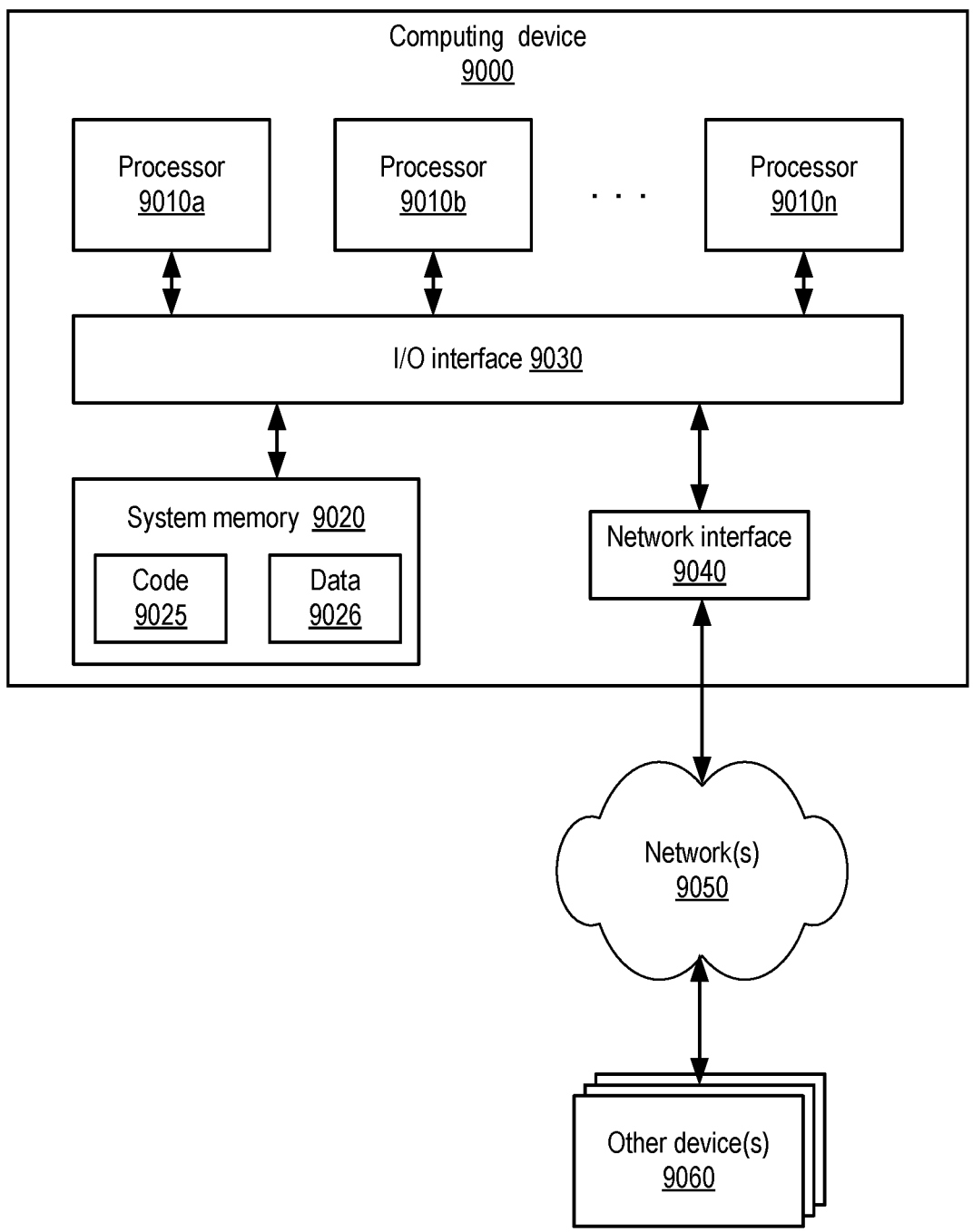
FIG. 11 is a block diagram illustrating an example computing device that may be used in at least some embodiments.

In at least some embodiments, a server that implements a portion or all of one or more of the technologies described herein, including the various components of a task-oriented dialog management service such as training subsystem elements, run-time subsystem elements and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more processors of an artificial intelligence service;
wherein the one or more computing devices are configured to:
train, using a training data set comprising a plurality of examples, a machine learning model to generate respective recommended responses to sequences of input natural language tokens generated by an entity in a multi-interaction task-oriented dialog, wherein a particular interaction of the multi-interaction task-oriented dialog comprises detecting a sequence of input natural language tokens generated by the entity and implementing a corresponding response, wherein the corresponding response comprises causing a sequence of output natural language tokens to be presented;
store a plurality of state-response entries in a repository, wherein a particular state-response entry indicates a mapping between (a) a representation of accumulated dialog state associated with one or more interactions indicated in an example of the training data set, wherein the representation is obtained from a trained version of the machine learning model and (b) a corresponding response indicated in the example of the training data set; and
in response to determining, as part of a particular multi-interaction task-oriented dialog, that a particular sequence of input natural language tokens has been generated by a first entity,
obtain, from a trained version of the machine learning model, a first representation of accumulated dialog state associated with the particular sequence;
identify, from the plurality of state-response entries stored in the repository, based at least in part on computing respective distance metrics between the first representation and respective representations of accumulated dialog states corresponding to respective ones of the state-response entries stored in the repository, a particular state-response entry meeting a distance criterion; and
cause a particular response indicated in the particular state-response entry to be implemented, wherein the particular response is indicated in a particular example of the training data set used for training the machine learning model.

2. The system as recited in claim 1, wherein the machine learning model comprises a neural network, and wherein the first representation of accumulated dialog state associated with the particular sequence comprises a vector generated at an internal layer of the neural network.

3. The system as recited in claim 1, wherein the particular sequence of natural language input comprises a first number of words, wherein a subsequent interaction of the particular multi-interaction task-oriented dialog comprises a different sequence of words generated by the first entity, wherein the different sequence comprises a different number of words, wherein the first representation of accumulated dialog state associated with the particular sequence comprises a first vector of a particular length, wherein the one or more computing devices are configured to:
obtain, from the machine learning model, a second vector representing accumulated dialog state associated with the different sequence, wherein the second vector has the same length as the first vector; and
cause a response indicated in another state-response entry to be implemented, wherein the other state-response entry is identified based at least in part on the second vector.

4. The system as recited in claim 1, wherein the machine learning model comprises a decoder unit which includes one or more long short-term memory units (LSTMs), and wherein the first representation of accumulated dialog state associated with the particular sequence comprises a vector generated at a layer of the decoder unit.

5. The system as recited in claim 4, wherein the machine learning model comprises an encoder unit which includes one or more long short-term memory units (LSTMs), and wherein the first representation of accumulated dialog state associated with the particular sequence comprises a vector generated at a layer of the encoder unit.

6. A method, comprising:
performing, by one or more computing devices:
storing a plurality of state-response entries, wherein a particular state-response entry indicates a mapping between (a) a representation of accumulated dialog state associated with one or more interactions of a multi-interaction task-oriented dialog, wherein the representation is obtained from a machine learning model trained to generate responses to natural language inputs and (b) a corresponding response indicated in a training example of a training data set used for training the machine learning model; and
in response to determining, as part of a particular multi-interaction task-oriented dialog, that a particular sequence of natural language input has been generated by a first entity,
obtaining, from the machine learning model, a first representation of accumulated dialog state associated with the particular sequence; and
causing at least a portion of a particular response indicated in a particular state-response entry to be implemented, wherein the particular state-response entry is retrieved from the stored plurality of state-response entries based at least in part on the first representation, wherein the particular response is indicated in aparticular training example of the training data set used for training the machine learning model.

7. The method as recited in claim 6, wherein the particular state-response entry indicates a mapping between a second representation of accumulated dialog state and the particular response, further comprising performing, by the one or more computing devices:
determining, to identify the particular state-response entry, a distance metric between the first representation and the second representation.

8. The method as recited in claim 7, wherein the distance metric comprises one or more of: (a) a Euclidean distance metric (b) a Manhattan distance metric or (c) a cosine distance metric.

9. The method as recited in claim 6, wherein the machine learning model comprises a neural network, and wherein the first representation of accumulated dialog state associated with the particular sequence comprises a vector generated at a layer of the neural network.

10. The method as recited in claim 6, wherein the particular sequence of natural language input comprises a first number of words, wherein a subsequent interaction of the particular multi-interaction task-oriented dialog comprises a different sequence of words generated by the first entity, wherein the different sequence comprises a different number of words, wherein the first representation of accumulated dialog state associated with the particular sequence comprises a first vector of a particular length, the method further comprising:
obtaining, from the machine learning model, a second vector representing accumulated dialog state associated with the different sequence, wherein the second vector has the same length as the first vector; and
causing a response indicated in another state-response entry to be implemented, wherein the other state-response entry is identified based at least in part on the second vector.

11. The method as recited in claim 6, wherein the machine learning model comprises a decoder unit, and wherein the first representation of accumulated dialog state associated with the particular sequence comprises a vector generated at a layer of the decoder unit.

12. The method as recited in claim 6, wherein the machine learning model comprises an encoder unit, and wherein the first representation of accumulated dialog state associated with the particular sequence comprises a vector generated at a layer of the encoder unit.

13. The method as recited in claim 6, further comprising performing, by the one or more computing devices:
training the machine learning model using a respective per-interaction instance of a pair of neural network based units, wherein the pair of units comprises an encoder unit and a decoder unit, wherein at least a subset of parameters of the encoders of the per-interaction instances are shared among the instances, and wherein at least a subset of respective parameters of the decoders of the per-interaction instances are shared among the instances.

14. The method as recited in claim 13, wherein training the machine learning model comprises including, in the input of an encoder module of a particular instance corresponding to a particular interaction of a first multi-interaction task-oriented dialog, a vector generated at an encoder module of another instance corresponding to an earlier interaction of the first multi-interaction task-oriented dialog.

15. The method as recited in claim 6, wherein the particular response comprises one or more of: (a) a presentation of one or more natural language tokens, (b) an invocation of an action implemented at a service or (c) a presentation of a result obtained from a service.

16. A non-transitory computer-accessible storage medium storing program instructions that when executed on one or more processors cause the one or more processors to:
in response to determining, as part of a particular multi-interaction task-oriented dialog, that a particular sequence of natural language input has been generated by a first entity,
obtain, from a first machine learning model trained using a training data set comprising a plurality of examples, a first representation of accumulated dialog state associated with the particular sequence;
retrieve, based at least in part on the first representation, a particular state-response entry from a collection of state-response entries, wherein the particular state-response entry indicates a mapping between (a) a second representation of accumulated dialog state, wherein the second representation was obtained using the trained first machine learning model and (b) a corresponding response indicated in one of the training examples of the training data set used for training the first machine learning model; and
cause at least a portion of the corresponding response identified in the retrieved particular state-response entry to be implemented.

17. The non-transitory computer-accessible storage medium as recited in claim 16, wherein the first machine learning model comprises a recurrent neural network model with one or more long short-term memory (LSTM) units.

18. The non-transitory computer-accessible storage medium as recited in claim 16, wherein the corresponding response comprises one or more of: (a) a presentation of one or more natural language tokens in a text format, (b) a presentation of one or more natural language tokens in an audio format, or (c) a presentation of a video.

19. The non-transitory computer-accessible storage medium as recited in claim 16, wherein to identify the particular state response entry from the collection of state response entries, the instructions when executed on the one or more processors cause the one or more processors to:

compute a distance metric between the first representation and the second representation.

20. The non-transitory computer-accessible storage medium as recited in claim 16, wherein the first machine learning model comprises a neural network, and wherein the first representation of accumulated dialog state comprises a vector generated at a layer of the neural network.

21. The non-transitory computer-accessible storage medium as recited in claim 16, wherein the instructions when executed on one or more processors cause the one or more processors to:

in response to determining, as part of another multi-interaction task-oriented dialog, that another sequence of natural language input has been generated by another entity, obtain a plurality of candidate responses to the other sequence of natural language input, including a first candidate response and a second candidate response, wherein the first candidate response is generated at least in part using the first machine learning model, and wherein the second candidate response is generated at least in part using a second machine learning model;

determine, based at least in part on the plurality of candidate responses, an aggregate response; and cause the aggregate response to be implemented.

\* \* \* \* \*